US009483953B2

(12) United States Patent
Nakajima

(10) Patent No.: US 9,483,953 B2
(45) Date of Patent: Nov. 1, 2016

(54) VOICE LEARNING APPARATUS, VOICE LEARNING METHOD, AND STORAGE MEDIUM STORING VOICE LEARNING PROGRAM

(75) Inventor: Daisuke Nakajima, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 527 days.

(21) Appl. No.: 13/568,397

(22) Filed: Aug. 7, 2012

(65) Prior Publication Data

US 2013/0041668 A1  Feb. 14, 2013

(30) Foreign Application Priority Data

Aug. 10, 2011  (JP) .................................. 2011-174467

(51) Int. Cl.
*G10L 13/00* (2006.01)
*G10L 13/08* (2013.01)
*G09B 5/06* (2006.01)

(52) U.S. Cl.
CPC ........ *G09B 5/06* (2013.01); *G10L 13/00* (2013.01)

(58) Field of Classification Search
CPC ............. G06F 17/289; G06F 17/2735; G06F 3/0482; G06F 17/20
See application file for complete search history.

(56) References Cited

U.S. PATENT DOCUMENTS

| 6,748,358 | B1* | 6/2004 | Iwasaki et al. ............... 704/258 |
| 2002/0051955 | A1* | 5/2002 | Okutani et al. ............... 434/185 |
| 2003/0200088 | A1* | 10/2003 | Tsao ............................. 704/251 |
| 2004/0167770 | A1* | 8/2004 | Zhuo et al. ....................... 704/4 |
| 2006/0031072 | A1* | 2/2006 | Okutani et al. ............... 704/260 |
| 2006/0218503 | A1* | 9/2006 | Matthews ............ G06F 9/4443 715/779 |
| 2006/0229874 | A1* | 10/2006 | Kaneyasu ..................... 704/260 |
| 2006/0247920 | A1* | 11/2006 | Toriyama ...................... 704/201 |
| 2008/0172226 | A1* | 7/2008 | Abe et al. ...................... 704/235 |
| 2012/0060093 | A1* | 3/2012 | Lee .............................. 715/716 |
| 2012/0077155 | A1* | 3/2012 | Siani ............................. 434/156 |
| 2012/0254802 | A1* | 10/2012 | Tinkler ............... G06F 17/2735 715/830 |
| 2013/0177891 | A1* | 7/2013 | Hammerschmidt .......... 434/309 |

FOREIGN PATENT DOCUMENTS

| JP | 08-050445 A | 2/1996 |
| JP | 2003-307997 A | 10/2003 |
| JP | 2005148727 A | 6/2005 |
| JP | 2005321662 A | 11/2005 |
| JP | 2007-094269 A | 4/2007 |
| JP | 2007163801 A | 6/2007 |
| JP | 2007-219218 A | 8/2007 |
| JP | 2010-262090 A | 11/2010 |
| WO | WO 2010131911 A2 * | 11/2010 ............ G09B 19/06 |

OTHER PUBLICATIONS

Japanese Office Action (and English translation thereof) dated Jun. 30, 2015, issued in counterpart Japanese Application No. 2011-174467.

* cited by examiner

*Primary Examiner* — Michael Ortiz Sanchez
(74) *Attorney, Agent, or Firm* — Holtz, Holtz & Volek PC

(57) ABSTRACT

A voice learning apparatus includes a learning-material voice storage unit that stores learning material voice data including example sentence voice data; a learning text storage unit that stores a learning material text including an example sentence text; a learning-material text display controller that displays the learning material text; a learning-material voice output controller that performs voice output based on the learning material voice data; an example sentence specifying unit that specifies the example sentence text during the voice output; an example-sentence voice output controller that performs voice output based on the example sentence voice data associated with the specified example sentence text; and a learning-material voice output restart unit that restarts the voice output from a position where the voice output is stopped last time, after the voice output is performed based on the example sentence voice data.

9 Claims, 7 Drawing Sheets

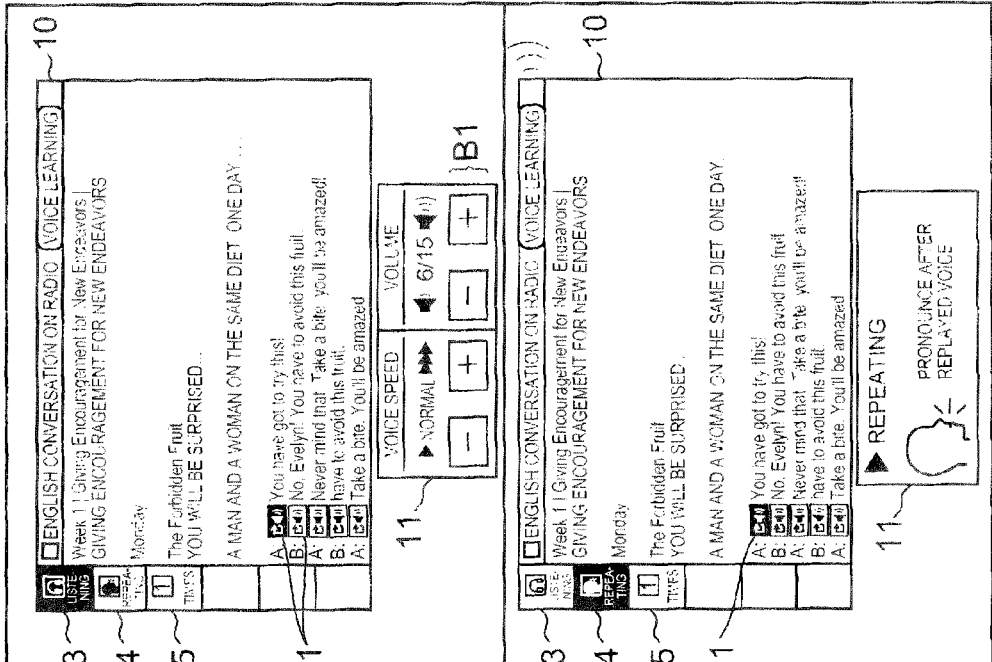
FIG. 6A
FIG. 6B
FIG. 6C
FIG. 6D

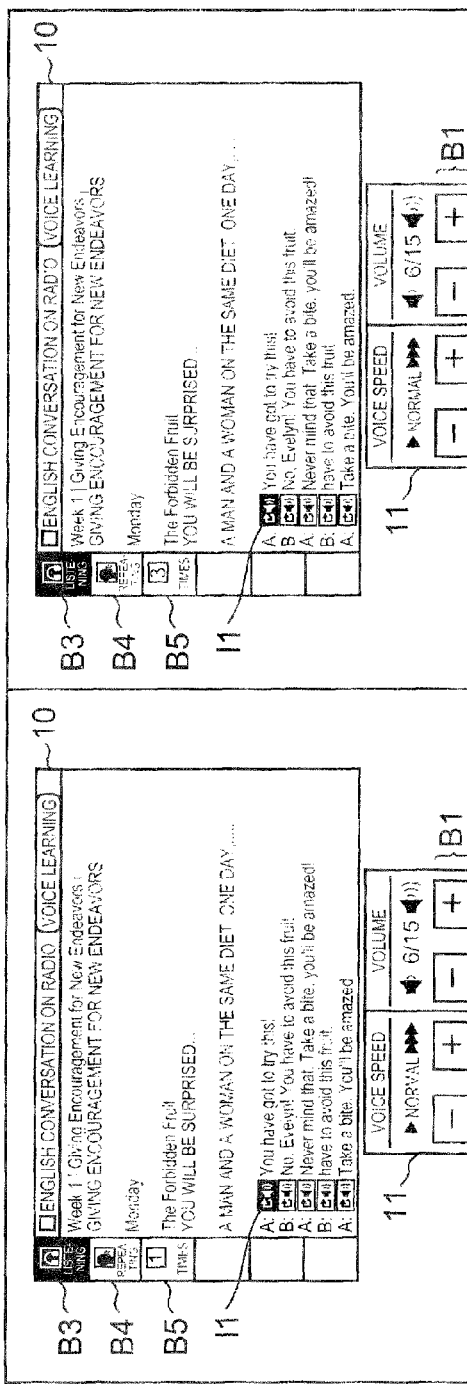
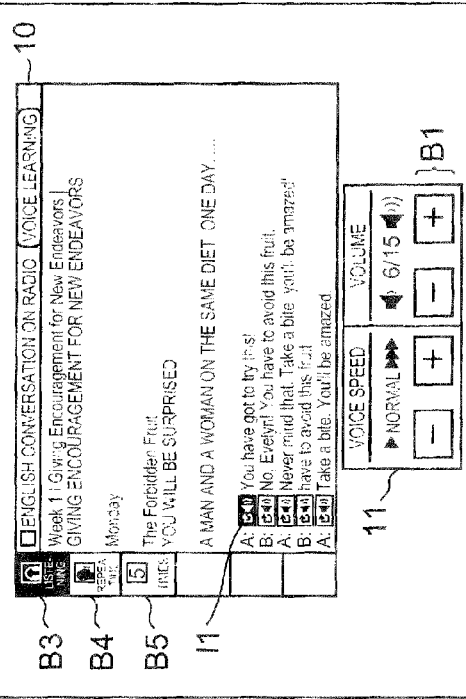
FIG. 7A  FIG. 7B  FIG. 7C

VOICE LEARNING APPARATUS, VOICE LEARNING METHOD, AND STORAGE MEDIUM STORING VOICE LEARNING PROGRAM

BACKGROUND OF THE INVENTION

1. Field of the Invention

The present invention relates to a voice learning apparatus, a voice learning method, and a storage medium storing a voice learning program.

2. Description of Related Art

Conventional voice learning apparatuses having speakers to output voice for language study can output model voice multiple times or compare the model voice with voice of users repeating the model voice. Nowadays, such a voice learning apparatus has a display unit and, when a user temporarily stops voice output, the apparatus can display the meaning and explanation of a word being outputted as voice, and then, can restart the voice output.

Recent voice learning apparatuses contain voice learning materials as contents produced for television or radio programs. In such contents, performers make small talk, give explanations by comparison of former and latter example sentences, or talk about topics related to the contents of example sentences so as to prevent learners from getting bored.

When listening to an example sentence in learning with such voice contents, a learner may want to listen to an example sentence before or after the current example sentence. Alternatively, a learner may want to repeatedly output voice for an important example sentence, while paying less attention to a small talk part. This enables a user to well understand any example sentence in voice contents.

Since such voice contents are intended to improve language skill through the entire contents, the effect of learning is decreased if voice output is not performed for the entire contents.

SUMMARY OF THE INVENTION

It is an object of the present invention to provide a voice learning apparatus, a voice learning method, and a storage medium storing a voice learning program that enable a user to well understand any example sentence in a voice learning material while the user learns the entire voice learning material.

According to an aspect of the present invention, there is provided a voice learning apparatus including: a learning-material voice storage unit that stores learning material voice data including example sentence voice data; a learning text storage unit that stores a learning material text corresponding to a content of the learning material voice data, the learning material text including at least one example sentence text associated with a corresponding portion of the example sentence voice data; a learning-material text display controller that displays the learning material text stored in the learning text storage unit; a learning-material voice output controller that performs voice output based on the learning material voice data corresponding to the learning material text displayed by the learning-material text display controller; an example sentence specifying unit that specifies one of the at least one example sentence text in the learning material text, as a specified example sentence, in response to a user operation while the learning-material voice output controller is performing the voice output; an example-sentence voice output controller that performs voice output based on the example sentence voice data associated with the specified example sentence in the learning material voice data, when the example sentence specifying unit specifies the specified example sentence; and a learning-material voice output restart unit that restarts the voice output based on the learning material voice data, in response to the user operation, from a position where the learning-material voice output controller stops the voice output last time, after the voice output is performed based on the example sentence voice data associated with the specified example sentence.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6A illustrates contents appearing on the display;

FIG. 6B illustrates contents appearing on the display;

FIG. 6C illustrates contents appearing on the display;

FIG. 6D illustrates contents appearing on the display;

FIG. 7A illustrates contents appearing on the display;

FIG. 7B illustrates contents appearing on the display; and

FIG. 7C illustrates contents appearing on the display.

DESCRIPTION OF THE PREFERRED EMBODIMENTS

Embodiments of a voice learning apparatus according to the present invention that is applied to an electronic dictionary will now be described in detail with reference to the accompanying drawings.

[Outline Configuration]

Figure 1:
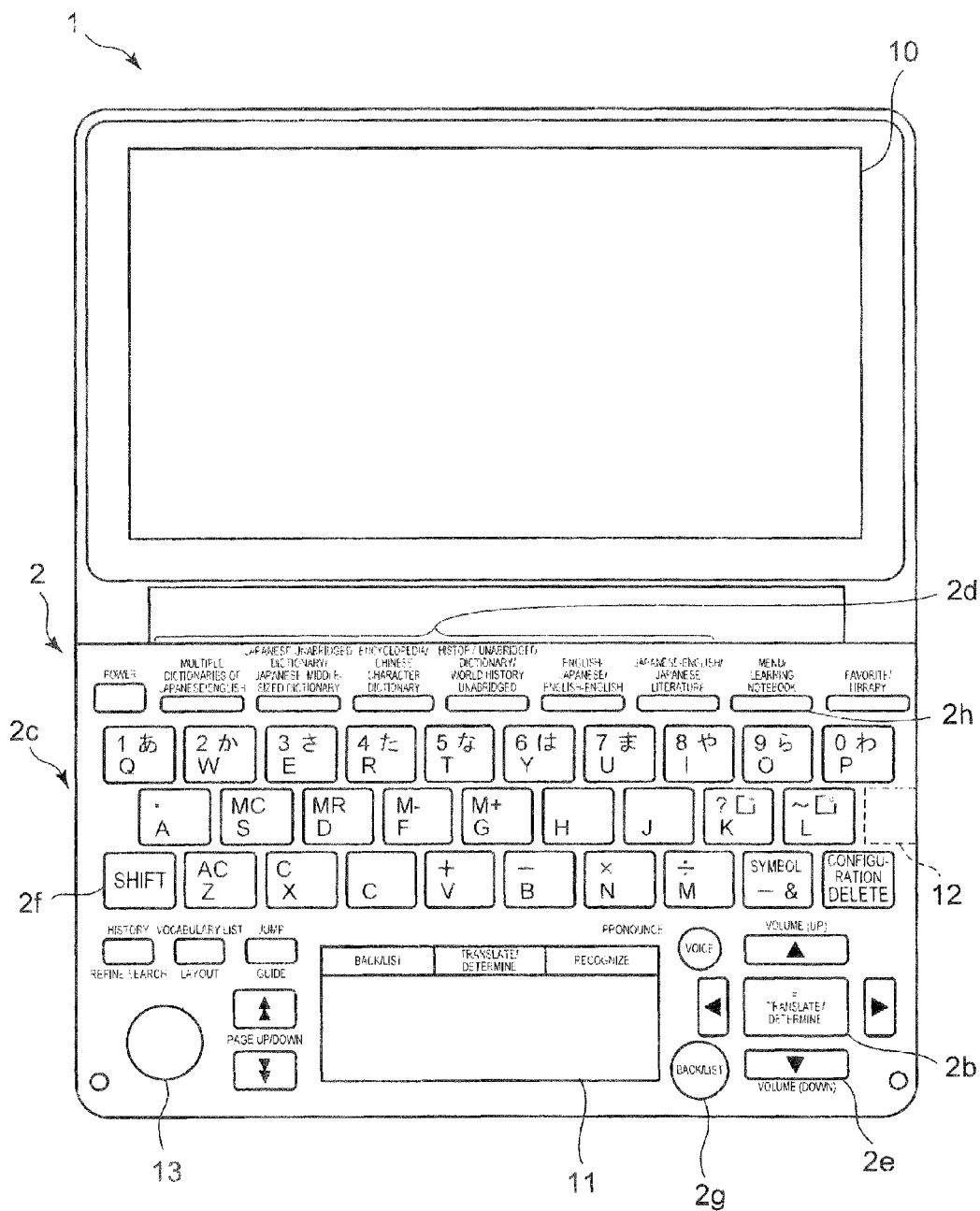
FIG. 1 is a plan view illustrating a schematic appearance of an electronic dictionary.

FIG. 1 is a plane view of an electronic dictionary 1.

As illustrated in FIG. 1, the electronic dictionary 1 includes a main display 10, a sub-display 11, a card slot 12, a speaker 13, and a key group 2.

The main display 10 and the sub-display 11 display various types of data such as characters and symbols in full color in response to the operation of the key group 2 by a user and are composed of, for example, a liquid crystal display (LCD) or an electroluminescent display (ELD). The main display 10 and the sub-display 11 in the present embodiment are integrated with a touch panel 110 (see FIG. 2) and can receive operations such as handwriting input.

An external information storage medium 12*a* (see FIG. 2) storing various types of information can be inserted into and ejected from the card slot 12.

The speaker 13 outputs voice in response to operations of the key group 2 by the user.

The key group 2 includes various keys to receive operations for the electronic dictionary 1 from the user. In detail, the key group 2 includes a translation/determination key 2*b*, character keys 2*c*, dictionary selection keys 2*d*, cursor keys 2*e*, a shift key 2*f*, a back key 2*g*, and a menu key 2*h*.

The translation/determination key 2b is used, for example, for searching for and determining a direction word. The character keys 2c are used, for example, for inputting characters by the user and include "A" to "Z" keys in the present embodiment. The dictionary selection keys 2d are used for selecting dictionary databases 820, ... (see FIG. 2) described below.

The cursor keys 2e are used, for example, for moving a highlighted position, i.e., a cursor position on a screen and can select up, down, right, and left directions in the present embodiment. The shift key 2f is used, for example, for setting a Japanese word as a search term. The back key 2g is used, for example, for returning to a previous screen. The menu key 2h is used for setting various modes.

[Internal Configuration]

Figure 2:
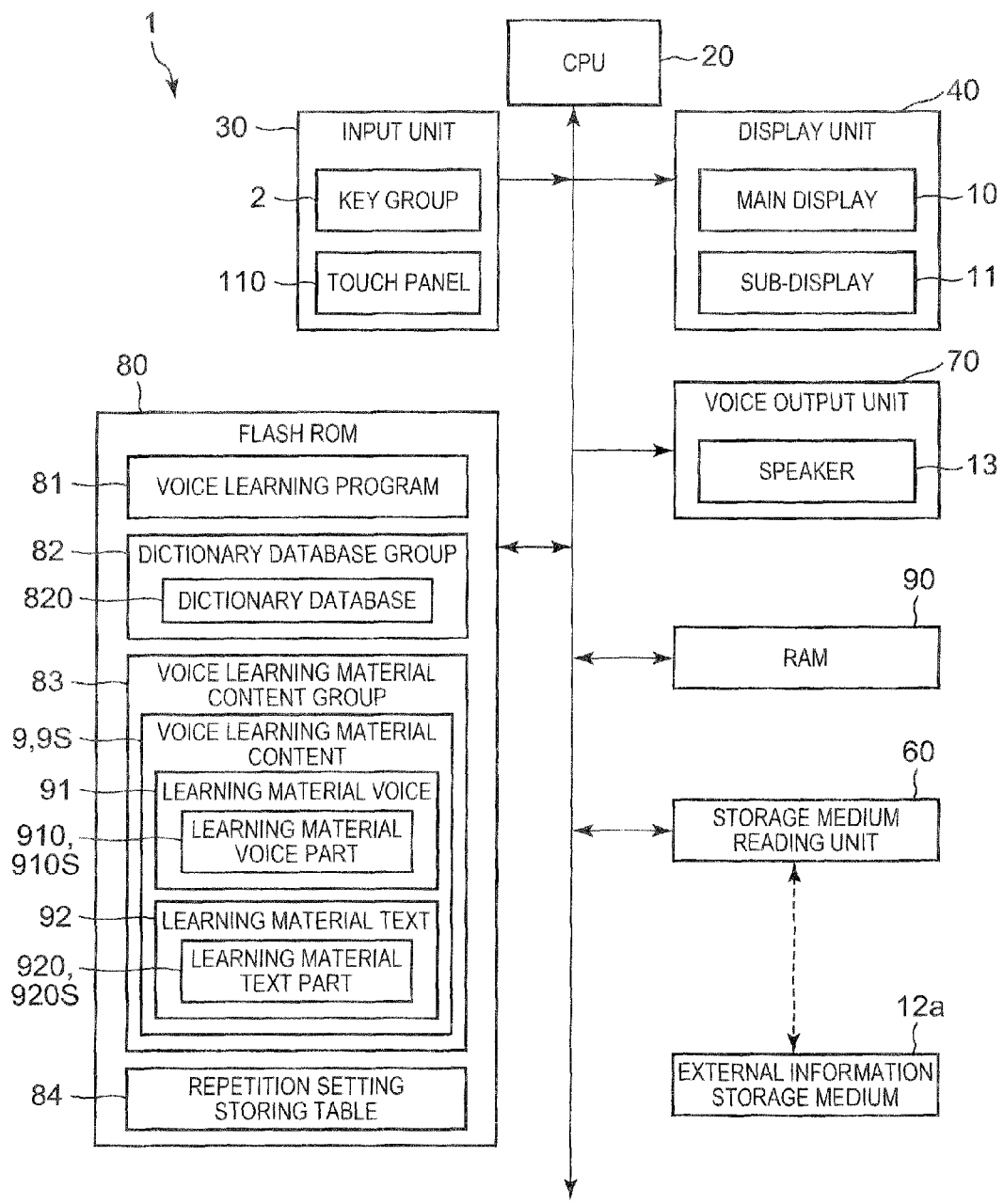
FIG. 2 is a block diagram illustrating the internal configuration of the electronic dictionary.

An internal configuration of the electronic dictionary 1 will now be described. FIG. 2 is a block diagram illustrating the internal configuration of the electronic dictionary 1.

As illustrated in FIG. 2, the electronic dictionary 1 includes a display unit 40, an input unit 30, a voice output unit 70, a storage medium reading unit 60, a central processing unit (CPU) 20, a flash read only memory (ROM) 80, and a random access memory (RAM) 90, which are interconnected through a bus for data communication.

The display unit 40 includes the main display 10 and the sub-display 11 which display various pieces of information based on display signals received from the CPU 20.

The input unit 30 includes the key group 2 and the touch panel 110 which output a signal corresponding to a pressed key or a touched position in the touch panel 110 to the CPU 20.

The voice output unit 70 includes the speaker 13 which outputs voice from the speaker 13 on the basis of voice output signals received from the CPU 20.

The storage medium reading unit 60, which includes the card slot 12, reads information from the external information storage medium 12a inserted in the card slot 12 and stores information onto the external information storage medium 12a.

The external information storage medium 12a contains the dictionary database 820 and voice learning material contents 9. The dictionary database 820 and the voice learning material contents 9 have data structures similar to dictionary databases 820 and voice learning material contents 9 in the flash ROM 80 described below. Descriptions thereon is therefore omitted now.

The flash ROM 80 stores a program and data for implementing various functions of the electronic dictionary 1. In the present embodiment, the flash ROM 80 stores, for example, a voice learning program 81 according to the present invention, a dictionary database group 82, a voice learning material content group 83, and a repetition setting storing table 84.

The voice learning program 81 causes the CPU 20 to perform a voice learning process (see FIG. 3) described below.

The dictionary database group 82 includes a plurality of dictionary databases 820. In the present embodiment, the dictionary databases 820 are, for example, for an English-Japanese dictionary and an English-Chinese dictionary. The dictionary databases 820, ... contain a plurality of pieces of direction-word information each of which correlates a direction word with its explanation information.

The voice learning material content group 83 includes a plurality of voice learning material contents 9. In the present embodiment, the voice learning material content group 83 includes the voice learning material contents 9 for respective English conversation programs broadcast by radio from Monday to Friday during a predetermined period.

Each of the voice learning material contents 9 includes learning material voice 91 and a learning material text 92.

The learning material voice 91 is voice data of the English conversation programs. In the present embodiment, the learning material voice 91 includes a plurality of serial learning material voice parts 910. In the present embodiment, the learning material voice 91 includes voice data for repeatable example sentences for learning (hereinafter simply referred to as "repeatable example sentences"), which will be described later. The learning material voice 91 is composed of seven learning material voice parts 910, i.e., "Greetings", "Dialog", "Words & Phrases", "Apply It!", "Say It!", "Dialog Repeat", and "Try It in a New Situation". The learning material voice parts 910 have titles each of which is a combination of the learning theme of the relevant voice learning material content 9 with "Greetings", "Dialog", "Words & Phrases", "Apply It!", "Say It !", "Dialog Repeat", or "Try It in a New Situation". Each learning material voice part 910 is stored in association with information about whether voice output is finished for the learning material voice part 910.

The learning material text 92 is the data corresponding to a content of the learning material voice, that is, the learning material text 92 is text data for the learning material voice 91. In the present embodiment, the learning material text 92 is composed of a plurality of learning material text parts 920 each of which corresponds one-to-one with each of the learning material voice parts 910. Each of the contents of the learning material text parts 920 does not necessarily need to be completely the same as each of the contents of the learning material voice parts 910. For example, a portion which is not related to the learning may be omitted from the content.

The learning material text 92 includes a plurality of repeatable example sentences. A tag indicating the position of the corresponding portion of the learning material voice 91 (the portion corresponding to each repeatable example sentence) is embedded near the repeatable example sentence (at the head of the sentence in the present embodiment). A plurality of repeatable example sentences in the learning material text 92 are thereby stored in association with portions of the learning material voice 91, which portions correspond to the respective repeatable example sentences.

The repetition setting storing table 84 stores a setting for a mode in performing voice output for a repeatable example sentence (hereinafter referred to as a voice learning mode) and a setting for the number of repetitions. In the present embodiment, the repetition setting storing table 84 stores one of "Listening" (a mode to allow the user to listen to the voice output for the repeatable example sentence) and "Repeating" (a mode to allow the user to listen to the voice output for the repeatable example sentence and then to repeat the voice output), as the settings for the voice learning mode.

The RAM 90 includes a memory region temporarily holding, for example, various programs to be executed by the CPU 20 and data for executing the programs.

The CPU 20 executes a process based on a predetermined program in response to an inputted instruction, and transfers instructions and data to functional units for overall controlling of the electronic dictionary 1. Specifically, the CPU 20 reads a program stored in the flash ROM 80 in response to, for example, operation signals received from the input unit 30, and performs a process on the basis of the program. The CPU 20 then stores the results of the process in the RAM 90 and properly outputs the results from the voice output unit 70 or the display unit 40.

[Operations]

Operations of the electronic dictionary 1 will now be described with reference to the accompanying drawings.

(Voice Learning Process)

Figure 3:
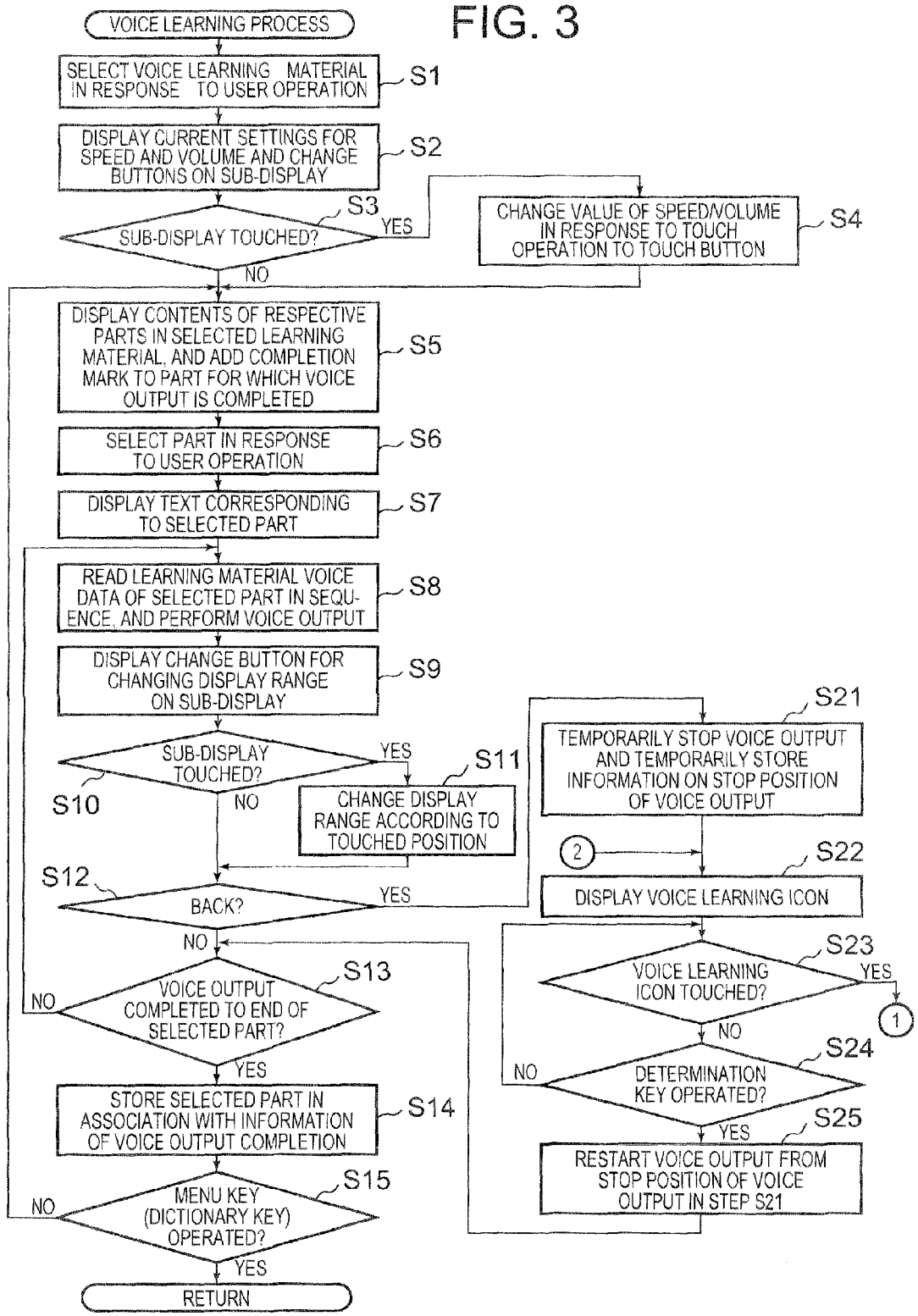
FIG. 3 is a flowchart illustrating a voice learning process.

FIG. 3 is a flowchart illustrating the flow of the voice learning process to be performed by the CPU 20 by reading the voice learning program 81.

As illustrated in FIG. 3, the CPU 20 selects one voice learning material content 9 as a selected learning material content 9S from the voice learning material content group 83 in response to a user operation in the voice learning process (Step S1). At this time, the user may select the voice learning material content 9 by selecting the ordinal number of episode in the English conversation programs or by selecting, for example, a month, week, or the day of a week.

The CPU 20 then displays the current settings for the speed and volume of a voice output and displays buttons for changing these settings (hereinafter referred to as speed/volume change buttons B1) (see FIG. 5A) on the sub-display 11 (Step S2).

The CPU 20 then determines whether the sub-display 11 is touched (Step S3). If the sub-display 11 is not touched (Step S3; No), the process goes to Step S5 described below.

If the CPU 20 determines that the sub-display 11 is touched (Step S3; Yes), the CPU 20 changes the speed and/or volume of a voice output in response to the touch operation to the speed/volume change button B1 (Step S4).

The CPU 20 then displays a list of the titles of the respective learning material voice parts 910 in the selected learning material content 9S on the main display 10, and displays a mark M (see FIG. 5B) representing completion of the voice output, which mark M is added to the title of a learning material voice part 910, for which the voice output is completed, among the displayed titles (Step S5).

The CPU 20 then selects one learning material voice part 910 as a selected learning material voice part 910S in response to a user operation (Step S6).

The CPU 20 then displays a learning material text part 920 (hereinafter referred to as a selected learning material text part 920S) corresponding to the selected learning material voice part 910S on the main display 10 (Step S7). More specifically, the CPU 20 displays a portion, which includes repeatable example sentences, of a selected learning material text part 920S on the main display 10 on the basis of tags embedded in the selected learning material text part 920S, and displays repeatable voice icons I1 (see FIG. 5C) at the heads of the respective repeatable example sentences.

The CPU 20 then performs voice output for the selected learning material voice parts 910S in sequence from the beginning through the speaker 13 (Step S8), and displays buttons for changing display range in the selected learning material text part 920S (hereinafter referred to as display range change buttons B2) (see FIG. 5C), on the sub-display 11 (Step S9). More specifically, the CPU 20 in Step S9 displays the display range change buttons B2 for changing the displayed page and for scrolling up or down the displayed range.

The CPU 20 then determines whether the sub-display 11 is touched (Step S10). If the sub-display 11 is not touched (Step S10; No), the process goes to Step S12 described below.

If the CPU 20 determines that the sub-display 11 is touched (Step S10; Yes), the CPU 20 changes the display range of the selected learning material text part 920S in response to the touch operation to any of the display range change buttons B2 (Step S11). At this time, the CPU 20 displays the repeatable voice icon I1 at the head of each repeatable example sentence displayed on the main display 10, on the basis of tags embedded in the selected learning material text part 920S.

The CPU 20 then determines whether the back key 2g is operated (Step S12). If the back key 2g is not operated (Step S12; No), the CPU 20 then determines whether the voice output for the selected learning material voice part 910S is completed to the end (Step S13).

If the voice output for the selected learning material voice part 910S is not completed to the end in Step S13 (Step S13; No), the process of the CPU 20 goes to Step S8.

If the voice output for the selected learning material voice part 910S is completed to the end in Step S13 (Step S13; Yes), the CPU 20 stores the selected learning material voice part 910S in association with information, which indicates completion of the voice output, in the flash ROM 80 (Step S14), and determines whether the menu key 2h or any of the dictionary selection keys 2d is operated (Step S15).

If the menu key 2h and any of the dictionary selection keys 2d are not operated in Step S15 (Step S15; No), the process of the CPU 20 goes to Step S5; otherwise (Step S15; Yes), the CPU 20 finishes the voice learning process and performs a process in accordance with an operated key.

If the back key 2g is operated in Step S12 (Step S12; Yes), the CPU 20 temporarily stops the voice output and temporarily stores information on the stop position in the selected learning material voice part 910S (Step S21).

The CPU 20 then displays a voice learning icon I2 (see FIG. 6A) for instructing the start of a voice learning of the repeatable example sentence at the edge of the main display 10 (Step S22), and determines whether the voice learning icon I2 is touched (Step S23).

If the voice learning icon I2 is not touched in Step S23 (Step S23; No), the CPU 20 then determines whether the translation/determination key 2b is operated (Step S24).

If the translation/determination key 2b is not operated in Step S24 (Step S24; No), the process of the CPU 20 goes to Step S23.

If the translation/determination key 2b is operated in Step S24 (Step S24; Yes), the CPU 20 restarts the voice output from the position where the voice output is temporarily stopped in Step S21 in the selected learning material voice part 910S, on the basis of the temporarily stored position information, i.e., the information on the stop position in the selected learning material voice part 910S (Step S25), and moves the process to Step S13.

Figure 4:
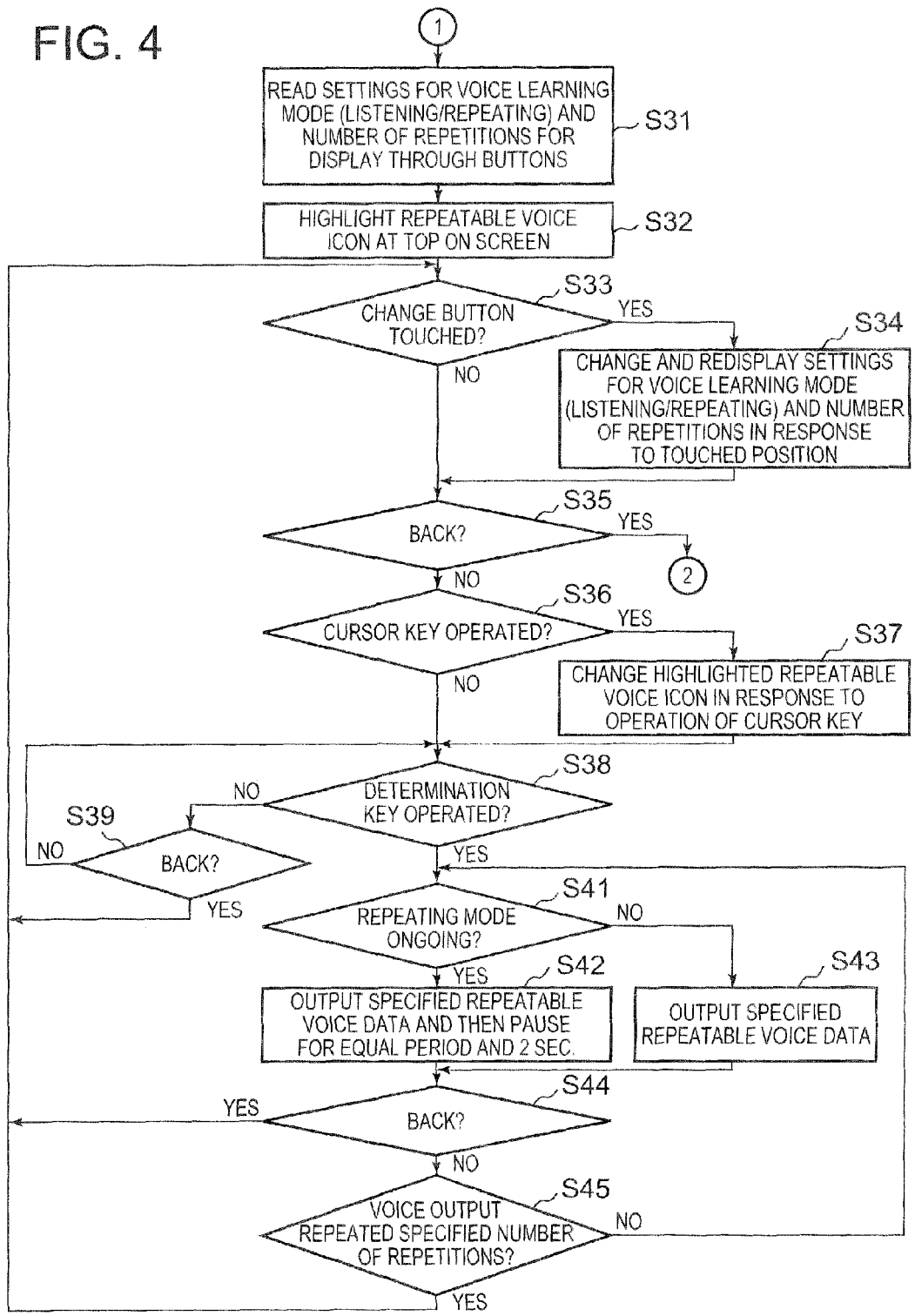
FIG. 4 is a flowchart illustrating the voice learning process.

If the voice learning icon I2 is touched in Step S23 (Step S23; Yes), the CPU 20 displays a listening button B3, a repeating button B4, and a number change button B5 at the edge of the main display 10 as illustrated in FIG. 4 (see FIG. 6B). The listening button B3 and the repeating button B4 are used for setting the voice learning mode to "Listening" and "Repeating", respectively. The number change button B5 is used for changing the number of repetitions. Additionally, the CPU 20 reads the current settings for the listening button B3, the repeating button B4, and the number change button B5 from the repetition setting storing table 84 and indicates the settings through the buttons B3, B4, and B5 (Step S31). More specifically, the CPU 20 highlights one of the listening button B3 and the repeating button B4 in accordance with the current voice learning mode and displays the current number of repetitions on the number change button B5. In the present embodiment, when the listening button B3 or the repeating button B4 are operated, the voice learning mode is set to "Listening" or "Repeating", respectively. When the number change button B5 is operated, the setting for the number of repetitions is changed in the order of "one", "three", and "five".

The CPU 20 then highlights the repeatable voice icon I1 at the top in the repeatable voice icons I1 displayed on the main display 10 (Step S32). The repeatable example sentence corresponding to the repeatable voice icon I1 in the selected learning material text part 920S, i.e., the repeatable example sentence at the top is set as a specified repeatable example sentence.

The CPU 20 then determines whether the listening button B3, the repeating button B4, or the number change button B5 is touched (Step S33). If the listening button B3, the repeating button B4, or the number change button B5 is not touched (Step S33; No), the process goes to Step S35 described below.

If the listening button B3, the repeating button B4, or the number change button B5 is touched in Step S33 (Step S33; Yes), the CPU 20 changes the settings for the voice learning mode and for the number of repetitions in response to the touch operation, and indicates the resultant settings through the listening button B3, the repeating button B4, and the number change button B5 (Step S34).

The CPU 20 then determines whether the back key 2g is operated (Step S35). If the back key 2g is operated (Step S35; Yes), the process goes to Step S22.

If the CPU 20 determines that the back key 2g is not operated in Step S35 (Step S35; No), the CPU 20 determines whether any of the cursor keys 2e is operated (Step S36).

If any of the cursor keys 2e is not operated in Step S36 (Step S36; No), the process of the CPU 20 goes to Step S38.

If the CPU 20 determines that any of the cursor keys 2e is operated in Step S36 (Step S36; Yes), the CPU 20 changes the specified repeatable voice icon I1 in response to the operation of the cursor key 2e and highlights the newly-specified repeatable voice icon I1 (Step 37). Thereby, the repeatable example sentence, which corresponds to the newly-specified repeatable voice icon I1 in the selected learning material text part 920S, is set as a specified repeatable example sentence. If the repeatable voice icon I1 outside of the display region of the main display 10 is to be specified in Step S37, the CPU 20 displays a range to be displayed by scrolling through the selected learning material text part 920S, and selects a repeatable example sentence in the selected learning material text part 920S as a specified repeatable example sentence.

The CPU 20 then determines whether the translation/determination key 2b is operated (Step S38). Alternatively, the CPU 20 in Step S38 may determine whether the repeatable voice icon I1 is touched.

If the translation/determination key 2b is not operated in Step S38 (Step S38; No), the CPU 20 determines whether the back key 2g is operated (Step S39). If the back key 2g is not operated (Step S39; No), the process goes to Step S38; otherwise (Step S39; Yes), the process goes to Step S33.

If the translation/determination key 2b is operated in Step S38 (Step S38; Yes), the CPU 20 refers to the repetition setting storing table 84 and determines whether the current voice learning mode is set to "Repeating" (Step S41).

If the voice learning mode is set to "Repeating" in Step S41 (Step S41; Yes), the CPU 20 performs voice output for a voice portion (hereinafter referred to as a specified-example-sentence voice portion) corresponding to the specified repeatable example sentence (the repeatable example sentence corresponding to the highlighted repeatable voice icon I1) in the selected learning material voice part 910S.

Then, the CPU 20 waits for a predetermined silent period to allow the user to repeat the voice (Step S42), and thereafter moves the process to Step S44 described below. In the present embodiment, the silent period is set to a time length obtained by adding two seconds to a time length required for the voice output for the specified-example-sentence voice portion. If the user touches the repeatable voice icon I1 instead of operating the translation/determination key 2b in Step S38, the CPU 20 sets the repeatable example sentence corresponding to the touched repeatable voice icon I1 as a specified repeatable example sentence in Step S42, and performs voice output for the specified-example-sentence voice portion.

If the voice learning mode is not set to "Repeating", that is, the voice learning mode is set to "Listening" in Step S41 (Step S41; No), the CPU 20 performs voice output for the specified-example-sentence voice portion (Step S43). If the user touches the repeatable voice icon I1 instead of operating the translation/determination key 2b in Step S38, the CPU 20 sets the repeatable example sentence corresponding to the touched repeatable voice icon I1 as a specified repeatable example sentence in Step S43, and performs voice output for the specified-example-sentence voice portion.

The CPU 20 then determines whether the back key 2g is operated (Step S44). If the back key 2g is operated (Step S44; Yes), the process goes to Step S33.

If the CPU 20 determines that the back key 2g is not operated in Step S44 (Step S44; No), the CPU 20 determines whether the voice output for the specified repeatable example sentence is repeated the number of repetitions stored in the repetition setting storing table 84 (Step S45).

If the voice output for the specified repeatable example sentence is not repeated the number of repetitions stored in the repetition setting storing table 84 in Step S45 (Step S45; No), the process of the CPU 20 goes to Step S41; otherwise (Step S45; Yes), the process goes to Step S33.

OPERATION EXAMPLES

The voice learning process will now be described in detail with reference to the accompanying drawings.

Figures 5A, 5B:
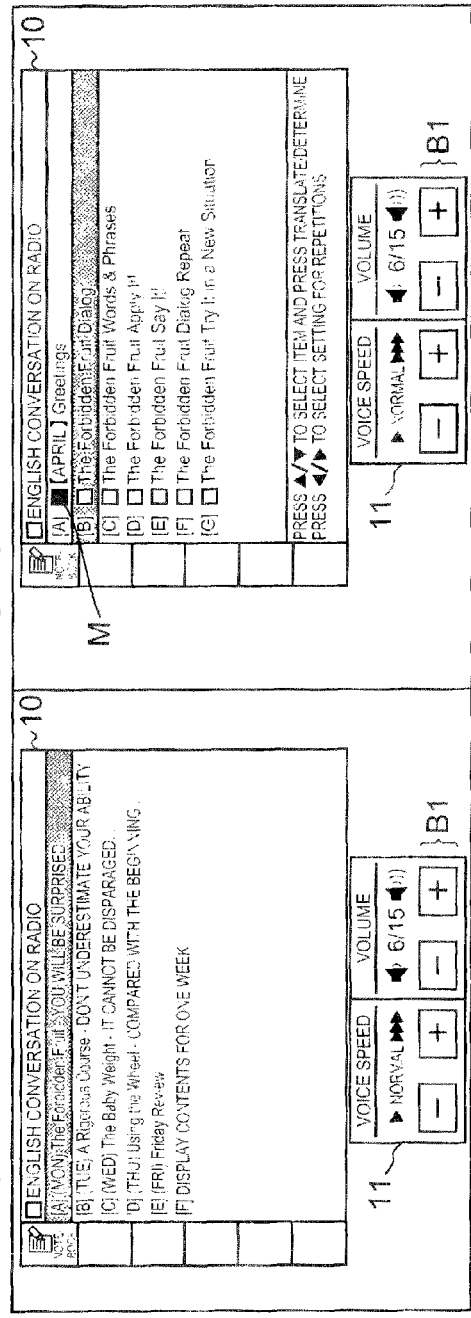
FIG. 5A illustrates contents appearing on a display.
FIG. 5B illustrates contents appearing on the display.

As illustrated in FIG. 5A, the user selects one voice learning material content 9 as the selected learning material content 9S from the voice learning material content group 83 (Step S1). The current settings for the speed and volume of the voice output and the speed/volume change buttons B1 are then displayed on the sub-display 11 (Step S2). In FIG. 5A, the main display 10 displays a state when the user selects a month and a week to display the titles of the voice learning material contents 9 for the respective days of the week, and selects the voice learning material content 9 for the Monday.

As illustrated in FIG. 5B, the list of the titles of the respective learning material voice parts 910 in the selected learning material content 9S is then displayed on the main display 10. Additionally, a mark M representing completion of the voice output is added to the title of a learning material voice part 910, for which the voice output is completed, among the displayed titles (Step S5).

Figure 5C:
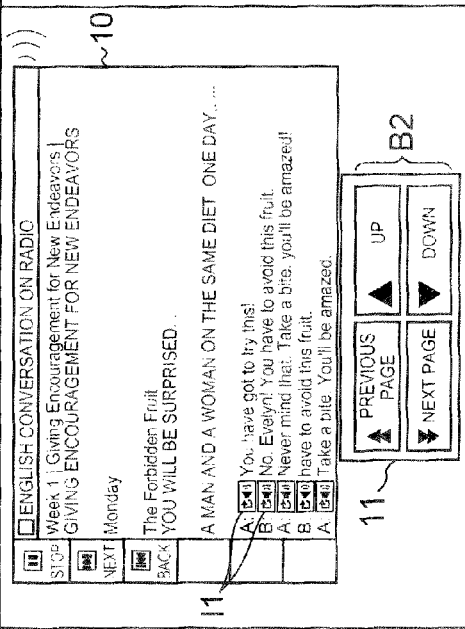
FIG. 5C illustrates contents appearing on the display.

The user then selects the learning material voice part 910 having a title, "The Forbidden Fruit Dialog" as the selected learning material voice part 910S (Step S6). A selected learning material text part 920S corresponding to the selected learning material voice part 910S is then displayed on the main display 10 as illustrated in FIG. 5C (Step S7).

More specifically, a portion, which includes repeatable example sentences, of a selected learning material text part 920S is displayed on the main display 10; and a repeatable voice icon I1 is displayed at the head of each repeatable example sentence.

Voice output is then performed for the selected learning material voice part 910S in sequence from the beginning through the speaker 13 (Step S8). Additionally, the display range change buttons B2 are displayed on the sub-display 11 (Step S9).

Next, if the user operates the back key 2g (Step S12; Yes), the voice output is temporarily stopped, and information on the stop position in the selected learning material voice part 910S is temporarily stored (Step S21). Additionally, a voice learning icon 12 is displayed at the edge of the main display 10 as illustrated in FIG. 6A (Step S22).

Next, if the user touches the voice learning icon 12 (Step S23; Yes), the listening button B3, the repeating button B4, and the number change button B5 are displayed at the edge of the main display 10 as illustrated in FIG. 6B. Additionally, the current settings for the voice learning mode and for the number of repetitions are read from the repetition setting storing table 84 and are indicated through the listening button B3, the repeating button B4, and the number change button B5 (Step S31). In the present operation example, the voice learning mode is set to "Listening" at this time while the number of repetitions is set to "one".

The repeatable voice icon I1 at the top is then specified and highlighted among the repeatable voice icons I1 displayed on the main display 10 (Step S32). The repeatable example sentence corresponding to the specified repeatable voice icon I1 in the selected learning material text part 920S, i.e., the repeatable example sentence at the top is set as a specified repeatable example sentence.

Next, if the user operates the translation/determination key 2b (Step S38; Yes), it is determined that the current voice learning mode is set to not "Repeating" but "Listening" as illustrated in FIG. 6C (Step S41; No), and voice output is performed for the specified-example-sentence voice portion once (Step S43, Step S45; Yes). After it is determined that the listening button B3, the repeating button B4, or the number change button B5 is not touched (Step S33; No), if the user operates the back key 2g (Step S35; Yes), and operates the translation/determination key 2b (Step S24; Yes), the voice output is restarted from the position where the voice output is temporarily stopped last time (See the explanations for FIG. 5C to FIG. 6A) in the selected learning material voice part 910S, on the basis of the temporarily stored position information, i.e., the information on the stop position in the selected learning material voice part 910S (Step S25).

In the case where the voice learning mode is set to "Repeating" in the state illustrated in FIG. 6B, if the user operates the translation/determination key 2b (Step S38; Yes), it is determined that the current voice learning mode is set to "Repeating" as illustrated in FIG. 6D (Step S41; Yes). In this case, the predetermined silent period passes after voice output is performed for the specified-example-sentence voice portion (Step S42).

If the user touches the number change button B5 in the state illustrated in FIG. 6B (Step S33; Yes), the setting for the number of repetitions is switched between "one," "three," and "five" in this order depending on the number of touch operations as illustrated in FIGS. 7A to 7C. Specifically, when the button B5 is touched zero times, three times, six times . . . , the number of repetitions is switched to "one"; when the button B5 is touched one time, four times . . . , the number of repetitions is switched to "three"; and when the button B5 is touched is two times, five times . . . , the number of repetitions is switched to "five". The resultant setting is indicated through the number change button B5 (Step S34).

As illustrated in, for example, Steps S21 to S25 in FIG. 3, Steps S31 to S45 in FIG. 4, and FIG. 6, when an example learning sentence in the learning material text 92 is specified in response to the user operation during voice output for the learning material voice 91, the electronic dictionary 1 performs voice output for a portion corresponding to the example learning sentence in the learning material voice 91, and after that, restarts the voice output for the learning material voice 91 from the position where the voice output was stopped last time, in response to the user operation. Accordingly, a user can well understand any example sentence in the voice learning material contents 9 and can completely learn the entire voice learning material contents.

As illustrated in, for example, Steps S34 and S45 in FIG. 4, the number of repetitions for the voice output is set in response to the user operation, and voice output is performed for a portion corresponding to an example sentence in the learning material voice 91, in accordance with the setting for the number of repetitions. Thus, the voice output for the example sentence can be repeated as many times as desired.

As illustrated in, for example, Steps S34, S42, and S43 in FIG. 4, the user sets whether to provide the silent period which allows the user to repeat a voice between voice outputs. That is, the user sets whether the voice learning mode is to be "Repeating" or "Listening". In accordance with this setting for the voice learning mode, voice output is performed for a portion corresponding to a specified example sentence in the learning material voice 91. Accordingly, the example sentence can be learned in an intended method of learning.

As illustrated in, for example, Step S5 in FIG. 3 and FIG. 5B, the list of titles of the respective learning material voice parts 910 is displayed in response to the user operation. Additionally, a mark M representing completion of the voice output is added to the title of a learning material voice part 910, for which the voice output is completed, among the displayed titles. This can ensure that voice output is performed for all the contents.

Embodiments to which the present invention is applicable are not limited to the above embodiments. Proper modifications can be applied without departing from the scope and spirit of the present invention.

For example, although a voice learning apparatus according to the present invention has been described as the electronic dictionary 1, the apparatus to which the present invention is applicable is by no means limited to such a product, but the present invention is generally applicable to the electronic devices such as cellular phones, personal computers, personal digital assistants (PDAs), and game machines. Furthermore, the voice learning program 81 according to the present invention may be stored in, for example, a memory card or a CD which is removable from the electronic dictionary 1.

The scope of the present invention is not limited to the embodiments described herein, but is claimed in the accompanying claims. Further, the scope of the present invention includes the scope of equivalents thereof.

The entire disclosure of Japanese Patent Application No. 2011-174467 filed on Aug. 10, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A voice learning apparatus comprising:
a memory; and
a processor;
wherein the memory stores learning material voice data including example sentence voice data and a learning material text corresponding to a content of the learning material voice data, the learning material text including at least one example sentence text associated with a corresponding portion of the example sentence voice data; and
wherein the processor is configured to perform processes including:
displaying a first text part of the learning material text stored in the memory, and in response to a first user operation, displaying a second text part of the learning material text that has not yet been displayed;
performing voice output based on the learning material voice data corresponding to the displayed first text part of the learning material text;
displaying, in response to a second user operation, a third text part neighboring the displayed first text part;
temporarily stopping the voice output in response to a third user operation while the voice output is being performed;
storing, as first position information, information regarding a first position in the learning material voice data where the voice output is temporarily stopped when the voice output is temporarily stopped;
specifying any one of the at least one example sentence text in the displayed learning material text as a specified example sentence, in response to a fourth user operation while the voice output is temporarily stopped;
performing voice output based on the example sentence voice data at a second position associated with the specified example sentence in the learning material voice data, when the specified example sentence is specified; and
restarting the voice output based on the learning material voice data from the first position in the learning material voice data in accordance with the stored first position information, after the voice output is performed based on the example sentence voice data associated with the specified example sentence.

2. The voice learning apparatus according to claim 1, wherein the processor is further configured to perform a process of setting a number of repetitions of the voice output based on the example sentence voice data associated with the specified example sentence to any number, in response to a fifth user operation, while the voice output based on the learning material voice data is temporarily stopped; and
wherein the process of performing the voice output based on the learning material voice data performs the voice output based on the example sentence voice data associated with the specified example sentence in accordance with the set number of repetitions.

3. The voice learning apparatus according to claim 1, wherein:
the learning material voice data includes a plurality of serial learning material voice parts;
the learning material text includes a plurality of learning material text parts corresponding to the respective learning material voice parts;
the displaying the second text part of the learning material text that has not yet been displayed comprises detecting, from among the plurality of learning material text parts of the learning material text, a learning material text part corresponding to a learning material voice part to be outputted, as a voice-output learning material text part, and displaying a portion of the voice-output learning material text part, the portion including the at least one example sentence text; and
the specifying the any one of the at least one example sentence text comprises displaying a range to be displayed by scrolling through the voice-output learning material text part, and specifying the any one of the at least one example sentence text in the voice-output learning material text part as the specified example sentence, in response to the fourth user operation.

4. The voice learning apparatus according to claim 3, wherein the processor is further configured to perform a process of displaying a list of titles of the respective learning material voice parts, in response to a sixth user operation, and displaying an indicator representing completion of the voice output, the indicator being added to a title of a learning material voice part for which the voice output is completed, from among the displayed titles.

5. A voice learning method for a computer including a memory and a processor, wherein the memory stores learning material voice data including example sentence voice data and a learning material text corresponding to a content of the learning material voice data, the learning material text including at least one example sentence text associated with a corresponding portion of the example sentence voice data, and wherein the method comprises:
displaying a first text part of the learning material text stored in the memory and, in response to a first user operation, displaying a second text part of the learning material text that has not yet been displayed;
performing voice output based on the learning material voice data corresponding to the displayed first text part of the learning material text;
displaying, in response to a second user operation, a third text part neighboring the displayed first text part;
temporarily stopping the voice output in response to a third user operation while the voice output is being performed;
storing, as first position information, information regarding a first position in the learning material voice data where the voice output is temporarily stopped when the voice output is temporarily stopped;
specifying any one of the at least one example sentence text in the displayed learning material text, as a specified example sentence, in response to a fourth user operation while the voice output is temporarily stopped;
performing voice output based on the example sentence voice data at a second position associated with the specified example sentence in the learning material voice data, when the specified example sentence is specified; and
restarting the voice output based on the learning material voice data from the first position in the learning material voice data in accordance with the stored first position information, after the voice output is performed based on the example sentence voice data associated with the specified example sentence.

6. A non-transitory computer-readable storage medium having a voice learning program stored thereon which is executable by a computer including a memory and a processor, wherein the memory stores learning material voice data including example sentence voice data and a learning material text corresponding to a content of the learning material voice data, the learning material text including at least one example sentence text associated with a corresponding portion of the example sentence voice data, and wherein the program is executable to control the computer to perform functions comprising:

displaying a first text part of the learning material text stored in the memory and, in response to a first user operation, displaying a second text part of the learning material text that has not yet been displayed;

performing voice output based on the learning material voice data corresponding to the displayed first text part of the learning material text;

displaying, in response to a second user operation, a third text part neighboring the displayed first text part;

temporarily stopping the voice output in response to a third user operation while the voice output is being performed;

storing, as first position information, information regarding a first position in the learning material voice data where the voice output is temporarily stopped when the voice output is temporarily stopped;

specifying any one of the at least one example sentence text in the displayed learning material text, as a specified example sentence, in response to a fourth user operation while the voice output is temporarily stopped;

performing voice output based on the example sentence voice data at a second position associated with the specified example sentence in the learning material voice data, when the specified example sentence is specified; and restarting the voice output based on the learning material voice data from the first position in the learning material voice data in accordance with the stored first position information, after the voice output is performed based on the example sentence voice data associated with the specified example sentence.

7. A voice learning apparatus comprising:
a display; and
a processor;
wherein the processor is configured to perform processes including:

displaying a first text part of a learning material text on the display and, in response to a first user operation, displaying on the display a second text part of the learning material text that has not yet been displayed;

performing voice output based on learning material voice data corresponding to the displayed first text part of the learning material text;

displaying, in response to a second user operation, a third text part neighboring the displayed first text part on the display;

temporarily stopping the voice output in response to a third user operation while the voice output is being performed;

temporarily storing, as first position information, information regarding a first position in the learning material voice data where the voice output is temporarily stopped when the voice output is temporarily stopped;

specifying an example sentence text from among at least one example sentence text in the displayed learning material text, as a specified example sentence, in response to a fourth user operation while the voice output is temporarily stopped;

performing voice output based on example sentence voice data at a second position associated with the specified example sentence in the learning material voice data, when the specified example sentence is specified; and restarting the voice output based on the learning material voice data from the first position in the learning material voice data in accordance with the stored first position information, after the voice output is performed based on the example sentence voice data associated with the specified example sentence.

8. A voice learning method for a voice learning apparatus including a display and a processor, the method comprising:

displaying a first text part of a learning material text on the display and, in response to a first user operation, displaying on the display a second text part of the learning material text that has not yet been displayed;

performing voice output based on learning material voice data corresponding to the displayed first text part of the learning material text;

displaying, in response to a second user operation, a third text part neighboring the displayed first text part on the display;

temporarily stopping the voice output in response to a third user operation while the voice output is being performed;

temporarily storing, as first position information, information regarding a first position in the learning material voice data where the voice output is temporarily stopped when the voice output is temporarily stopped;

specifying an example sentence text from among at least one example sentence text in the displayed learning material text, as a specified example sentence, in response to a fourth user operation while the voice output is temporarily stopped;

performing voice output based on example sentence voice data at a second position associated with the specified example sentence in the learning material voice data, when the specified example sentence is specified; and restarting the voice output based on the learning material voice data from the first position in the learning material voice data in accordance with the stored first position information, after the voice output is performed based on the example sentence voice data associated with the specified example sentence.

9. A non-transitory computer-readable storage medium having a voice learning program stored thereon which is executable to control a computer including a display and a processor to perform functions comprising:

displaying a first text part of a learning material text on the display and, in response to a first user operation, displaying on the display a second text part of the learning material text that has not yet been displayed;

performing voice output based on learning material voice data corresponding to the displayed first text part of the learning material text;

displaying, in response to a second user operation, a third text part neighboring the displayed first text part on the display;

temporarily stopping the voice output in response to a third user operation while the voice output is being performed;

temporarily storing, as first position information, information regarding a first position in the learning material voice data where the voice output is temporarily stopped when the voice output is temporarily stopped;

specifying an example sentence text from among at least one example sentence text in the displayed learning material text, as a specified example sentence, in response to a fourth user operation while the voice output is temporarily stopped;

performing voice output based on example sentence voice data at a second position associated with the specified example sentence in the learning material voice data, when the specified example sentence is specified; and restarting the voice output based on the learning material voice data from the first position in the learning material voice data in accordance with the stored first position information, after the voice output is performed based on the example sentence voice data associated with the specified example sentence.

* * * * *